(12) United States Patent
Kavosh et al.

(10) Patent No.: US 8,243,395 B2
(45) Date of Patent: Aug. 14, 2012

(54) METHOD OF UTILIZING A SOLDER REFLOW CHANNEL IN THE FORMATION OF A HARD DISK DRIVE

(75) Inventors: Iraj Kavosh, San Jose, CA (US); Russell D. Moates, San Jose, CA (US); Jorge Rubio, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 965 days.

(21) Appl. No.: 12/233,153

(22) Filed: Sep. 18, 2008

(65) Prior Publication Data
US 2010/0067150 A1 Mar. 18, 2010

(51) Int. Cl.
*G11B 5/48* (2006.01)
(52) U.S. Cl. .................................. 360/264.2
(58) Field of Classification Search .................. None
See application file for complete search history.

(56) References Cited

U.S. PATENT DOCUMENTS

| | | | | |
|---|---|---|---|---|
| 4,761,699 A * | 8/1988 | Ainslie et al. | ............. | 360/234.5 |
| 5,555,619 A * | 9/1996 | Maggio et al. | ................. | 29/860 |
| 5,815,347 A * | 9/1998 | Pattanaik | .................... | 360/234.5 |
| 5,896,245 A | 4/1999 | Aoyagi et al. | | |
| 5,995,325 A * | 11/1999 | Maggio et al. | ............. | 360/264.2 |
| 6,212,046 B1 * | 4/2001 | Albrecht et al. | ........... | 360/264.2 |
| 6,700,747 B2 | 3/2004 | Matz | | |
| 6,704,995 B2 | 3/2004 | Toensing et al. | | |
| 6,862,802 B2 | 3/2005 | Cruz et al. | | |
| 6,865,058 B2 | 3/2005 | Kube et al. | | |
| 6,870,708 B1 | 3/2005 | Fossum et al. | | |
| 6,944,936 B2 * | 9/2005 | Krinke | ....................... | 29/603.04 |
| 7,203,033 B2 | 4/2007 | Boutaghou | | |
| 7,239,484 B2 * | 7/2007 | Yamaguchi | ................ | 360/234.5 |
| 7,242,132 B2 | 7/2007 | Hida et al. | | |
| 7,307,816 B1 * | 12/2007 | Thornton et al. | ........... | 360/234.6 |
| 7,593,190 B1 * | 9/2009 | Thornton et al. | ........... | 360/234.6 |
| 7,804,663 B2 * | 9/2010 | Hirano et al. | ............... | 360/245.9 |
| 7,974,044 B1 * | 7/2011 | Myers et al. | ................ | 360/245.9 |
| 2006/0085970 A1 | 4/2006 | Hosaka et al. | | |
| 2007/0146934 A1 | 6/2007 | Boljanovic et al. | | |

FOREIGN PATENT DOCUMENTS

WO  WO-02101730  12/2002

OTHER PUBLICATIONS

Aoki, et al., "Numerical ball swaging analysis of head arm for hard disk drives", *Journal Microsystem Technologies* www.springerlink.com/content/n2492v645v382347, (Nov. 4, 2006).
Magnecomp International, "More Q and A", http://www.magnecomp.com/mg/datastorage/technology/education/_qalist/html, (2001).

* cited by examiner

*Primary Examiner* — Mark Blouin

(57) ABSTRACT

A method of utilizing a solder reflow channel in the formation of a hard disk drive is disclosed. The method provides a first hard disk drive component having at least one solder reflow channel, the at least one solder reflow channel for retaining a predeposited solder material. The solder reflow channel is utilized to provide a solder location for coupling the first hard disk drive component and a second hard disk drive component to the predeposited solder material.

18 Claims, 5 Drawing Sheets

METHOD OF UTILIZING A SOLDER REFLOW CHANNEL IN THE FORMATION OF A HARD DISK DRIVE

TECHNICAL FIELD

The present invention relates to the field of hard disk drive development, and more particularly to a method of attaching hard disk drive components.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a hard storage disk that spins at a standard rotational speed. An actuator moves a magnetic read/write head over the disk. The actuator arm carries a head gimbal assembly (HGA) that includes a slider and a suspension with a nose portion for directly contacting a ramp used during the load and unload cycles for a load/unload drive. The slider carries a head assembly that includes a magnetic read/write transducer or head for reading/writing information to or from any desired location on the disk.

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters 3.5 to 1 inches (and even smaller 0.8 inch). Advances in magnetic recording are also primary reasons for the reduction in size.

However, as the size of hard disk drives are reduced, the methods used for assembling the components within the hard disk drive and attaching components of the hard disk drive are quickly reaching design limitations. For example, the suspension portion of the head gimbal assembly is stainless steel while the arm is aluminum. Presently, these dissimilar metals, e.g., the arm and suspension, are swaged together due to the inability of welding dissimilar metals. However, because of the overall reduction in component size, the swaging is no longer as reliable as it was when the components were bigger and more surface area was available. In some cases, the swaging of the smaller components results in distortions to the mount plate resulting in deleterious gram loading and static attitude changes at the head. Moreover, the dynamic flutter is also increased.

Solutions to the swaging issue brought on by component size reduction include adhesive bonding or modification of component make-up such as forming the arm from stainless steel. However, adhesive bonding is not re-workable and if it is incorrectly applied the parts are no longer usable and must be scrapped. This is an expensive solution. Additionally, the formation of the components from different materials significantly degrades dynamic performance of the components.

SUMMARY

A method of utilizing a solder reflow channel in the formation of a hard disk drive is disclosed. The method provides a first hard disk drive component having at least one solder reflow channel, the at least one solder reflow channel for retaining a predeposited solder material. The solder reflow channel is utilized to provide a solder location for coupling the first hard disk drive component and a second hard disk drive component to the predeposited solder material.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system of utilizing a solder reflow channel in the formation of a hard disk drive.

In general, embodiments of the present invention provide a method and apparatus for forming one or more of the components of a hard disk drive using a solder reflow channel. In one embodiment, a solder reflow channel on a surface of a first hard disk drive component, such as a mount plate of a head gimbal assembly (HGA), and a solder reservoir coupled therewith are provided for holding a predeposited solder material. The predeposited solder material is placed within the solder reservoir. A surface of a second hard disk drive component, such as an actuator arm is placed in contact with the surface of first component such as an HGA mount plate.

A heat source is then directed at the solder reservoir. The predeposited solder material within the solder reservoir heats up and flows. The predeposited solder material migrates to the solder reflow channel coupled with the solder reservoir. The solder reflow channel then retains this predeposited solder material such that both the surface of the first hard disk drive component and the surface of the second hard disk drive component are coupled with the predeposited solder material. Once the predeposited solder material cools, the first hard disk drive component and the second hard disk drive component are bonded with each other via the soldering.

Figure 1:
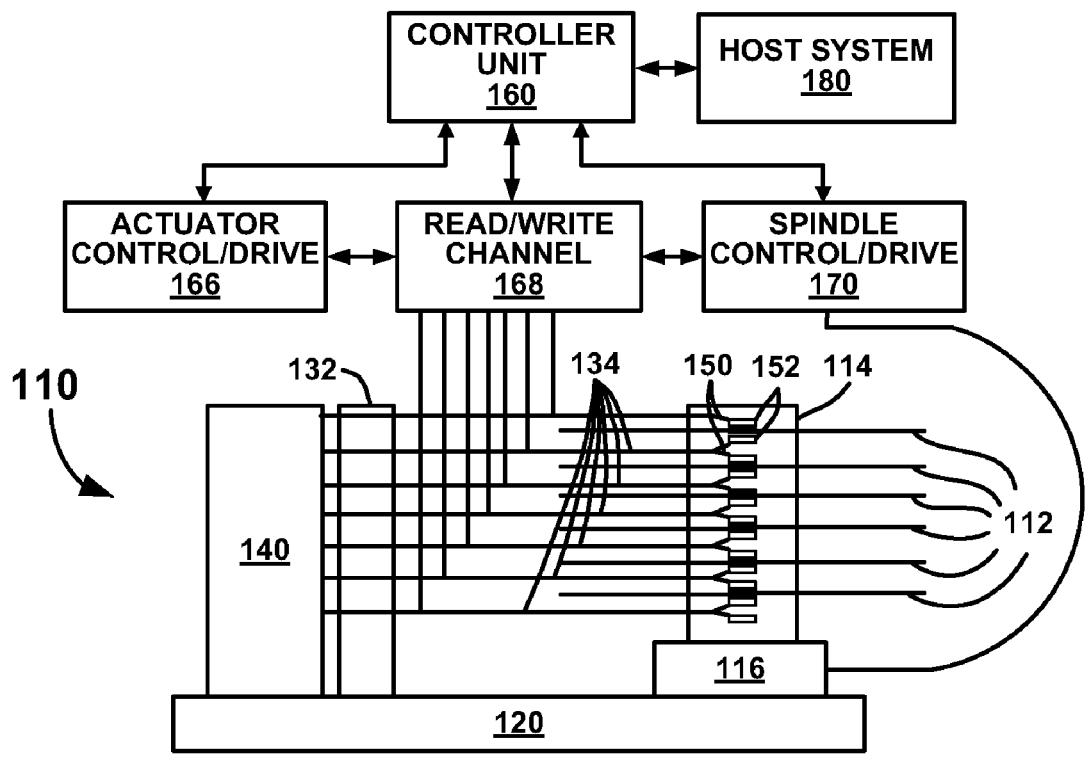
FIG. 1 is a side view of a disk drive system, in accordance with one embodiment of the present invention.
Figure 2:
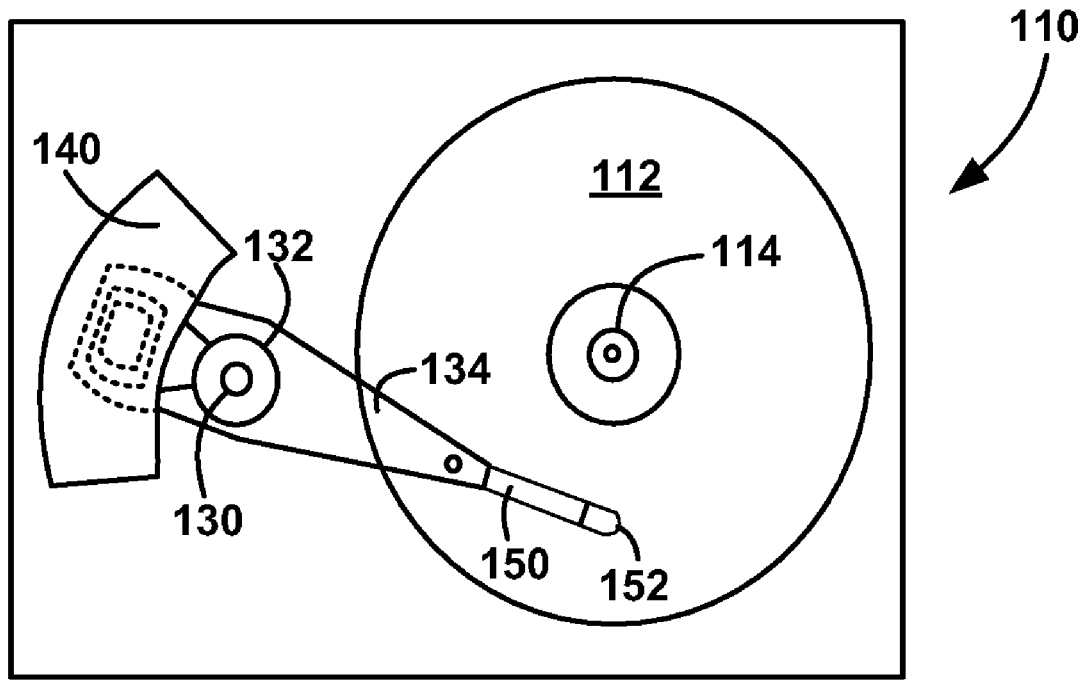
FIG. 2 is a top view of a disk drive system, in accordance with one embodiment of the present invention.

FIG. 1 and FIG. 2 show a side view and a top view, respectively, of a disk drive system designated by the general reference number 110. Embodiments of the present technology are well suited for utilization on disk drive system 110. The disk drive system 110 comprises a plurality of stacked magnetic recording disks 112 mounted to a spindle 114. The disks 112 may be conventional thin film recording disks or other magnetically layered disks. The spindle 114 is attached to a spindle motor 116, which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. A rotary voice coil motor 140 is attached to chassis 120 and to a rear portion of the actuator arms 134.

A plurality of integrated lead suspensions (ILS) 150 are attached to the actuator arms 134. A plurality of heads or transducers on sliders 152 are attached respectively to the suspensions 150. The sliders 152 are located proximate to the disks 112 so that, during operation, the heads or transducers are in electromagnetic communication with the disks 112 for reading and writing. The rotary voice coil motor 140 rotates actuator arms 134 about the actuator shaft 130 in order to move the suspensions 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that one skilled in the computer arts could also enable these aspects as hardware logic. Controller unit 160 is connected to an actuator control/drive unit 166 that in turn is connected to the rotary voice coil motor 140. This configuration also allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990.

Figure 3:
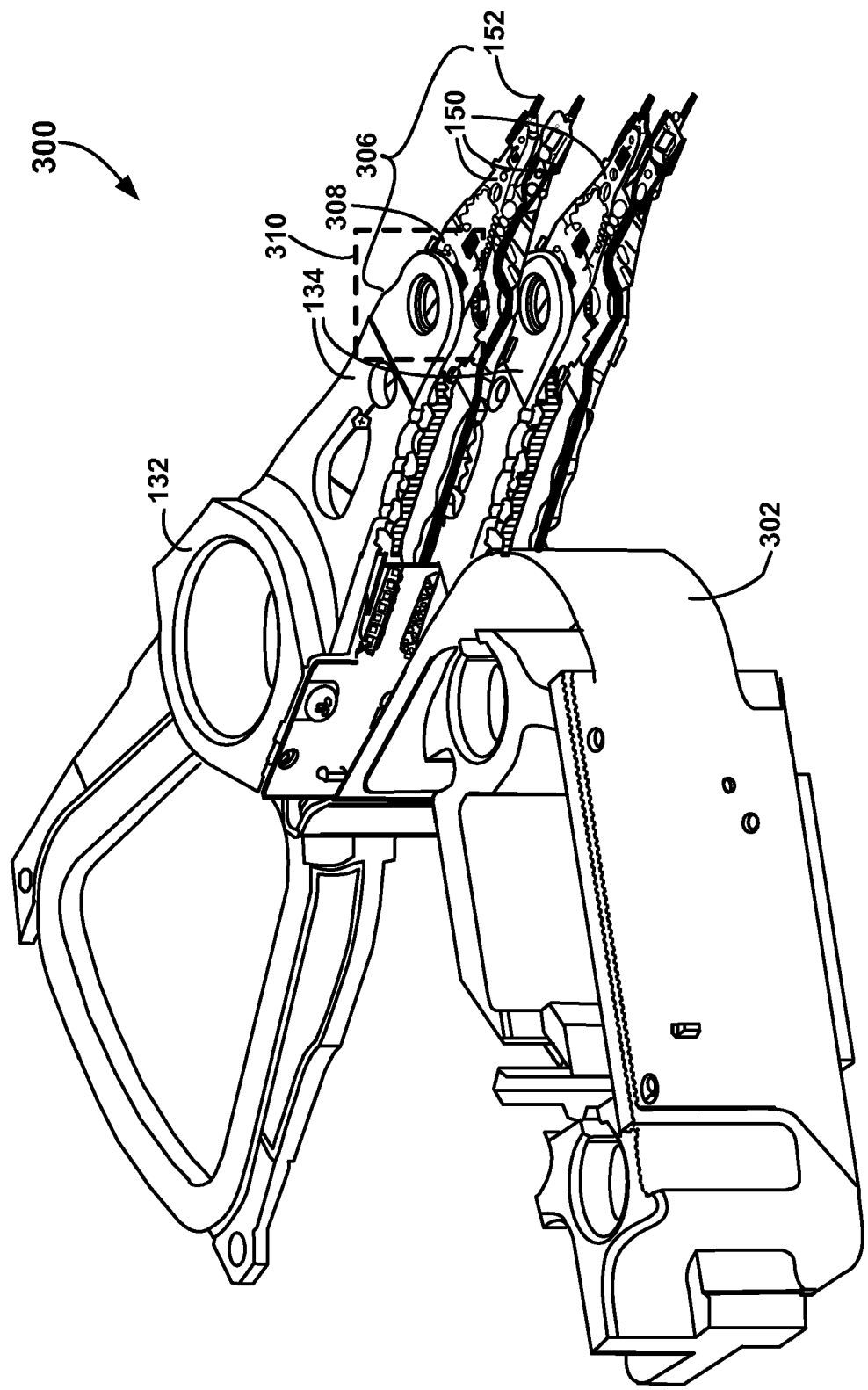
FIG. 3 is a perspective view of an example head stack assembly of a hard disk drive device, in accordance with one embodiment of the present invention.

FIG. 3 is a perspective view of an example head stack assembly (HSA) 300 of a hard disk drive device, according to an embodiment of the invention. Hard disk drive devices include HSA 300 that typically comprises a plurality of integrated lead suspensions 150 attached to a respective actuator arm 134. HSA 300 includes HGA 306, which typically comprising integrated lead suspensions 150 and hard disk drive slider 152. The HSA 300 assembly process involves a solder joining of head gimbal assembly (HGA) 306 with actuator arm 134. In this joining process a solder reflow channel holding a predeposited solder material is utilized to couple actuator arm 134 with mount plate 308 of HGA 306. See the dashed box 310 for an example of a location at which mount plate 308 is solder joined with actuator arm 134.

Figure 4:
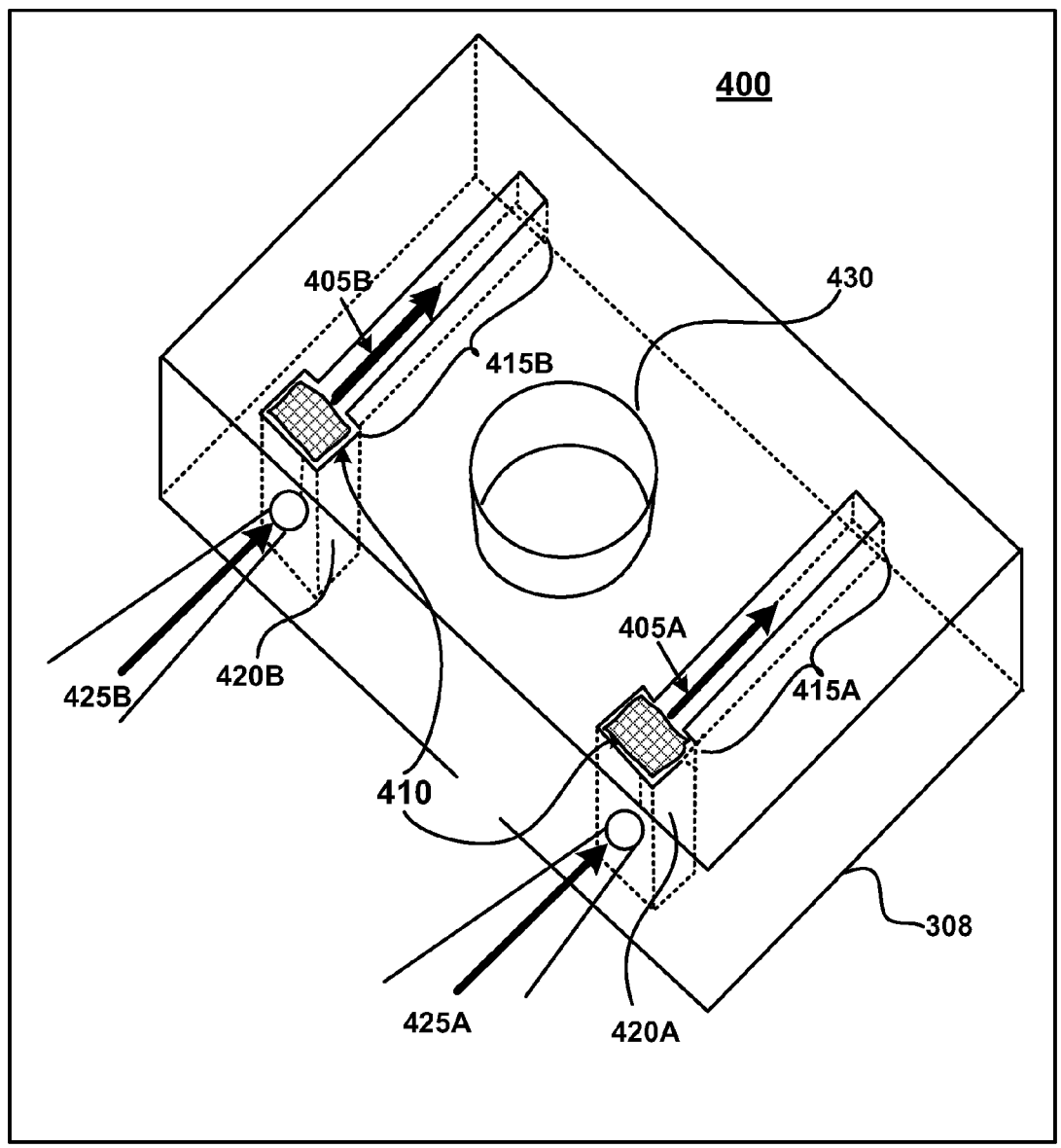
FIG. 4 is a perspective view of a mount plate of a head gimbal assembly of a hard disk drive, in accordance with one embodiment of the present invention.

With reference now to FIG. 4, a perspective view of a solder reflow channel reservoir system (SRCRS) 400 on mount plate 308 of HGA 306 of hard disk drive 110, in accordance with one embodiment of the present invention is shown. In one embodiment, SRCRS 400 includes mount plate 308, solder reflow channels 405A and 405B, predeposited solder material 410, solder locations 415A and 415B, solder reservoir 420A and 420B, heat source 425A and 425B, and swage hole 430. Of note, there may be any number of solder reflow channels, predeposited solder materials, solder locations, solder reservoirs, and heat sources, other than those shown in FIG. 4 and that is practicable.

With reference to 400A of FIG. 4, a solder reflow channel is located on a surface of a first hard disk drive component to retain predeposited solder material. For example, solder reflow channel 405A is on a surface of mount plate 308 of HGA 306. Additionally, solder reflow channel 405A is configured to retain predeposited solder material.

In one embodiment, the first hard disk drive component is an HSA 300. In another embodiment, the first hard disk drive component is an HGA 306. It should be appreciated that the method or system of utilizing a solder reflow channel may be applied to any number of hard disk drive components capable of supporting a channel of predeposited solder material 410.

In one embodiment, the predeposited solder material 410 may be a lead based material, such as a tin lead alloy. In another embodiment, the predeposited solder material 410 may be a lead free material.

Referring to 420A and 420B of FIG. 4, solder reservoirs utilized to hold the predeposited solder material 410 before the predeposited solder material 410 are heated and flows into solder reflow channel 405A is shown in accordance with one embodiment of the present technology. Solder reservoirs 420A and 420B are coupled with solder reflow channels 405A and 405B respectively.

Referring to 415A and 415B of FIG. 4, solder locations at which to couple the first hard disk drive component with a second hard disk drive component by heating the predeposited solder material 410 with a heating source 425A is shown in accordance with one embodiment of the present technology.

In one embodiment, the second hard disk drive component is the actuator arm 134. However, it should be appreciated that the second hard disk drive component may be any hard disk drive component capable of being soldered to the first hard disk drive component. Additionally, it should be noted that that there may be spaces between the surfaces of the first and second hard disk drive components that are not in contact with each other, other than at the location of the solder reflow channel(s). Consequently, any predeposited solder material 410 which flows into solder reflow channels 405A and 405B can also flow into any spaces between the surfaces of the first and second hard disk drive components.

Solder locations 415A and 415B may be described as the area coinciding with the entire surface of the solder reflow channels 415A and 415B.

In one embodiment, the heating sources 425A and 425B are a laser. Of note, heating sources 425A and 425B may be any such source that heats predeposited solder material 410 (e.g., laser, light).

In one embodiment, solder reflow channels 405A and 405B comprise a plurality of solder reflow channel veins on the surface of a hard disk drive component. In general, these solder reflow channel veins are smaller solder reflow channels than the solder reflow channels 415A and 415B shown in FIG. 4. These solder reflow channel veins may be interconnected or may be independent of each other. Additionally, the solder reflow channel veins may all branch off from larger solder reflow channels 415A and 415B, while being coupled with solder reservoirs 420A and 420B, respectively. In the alternative, the solder reflow channel veins may be coupled directly to solder reservoirs 420A and 420B.

Figure 5:
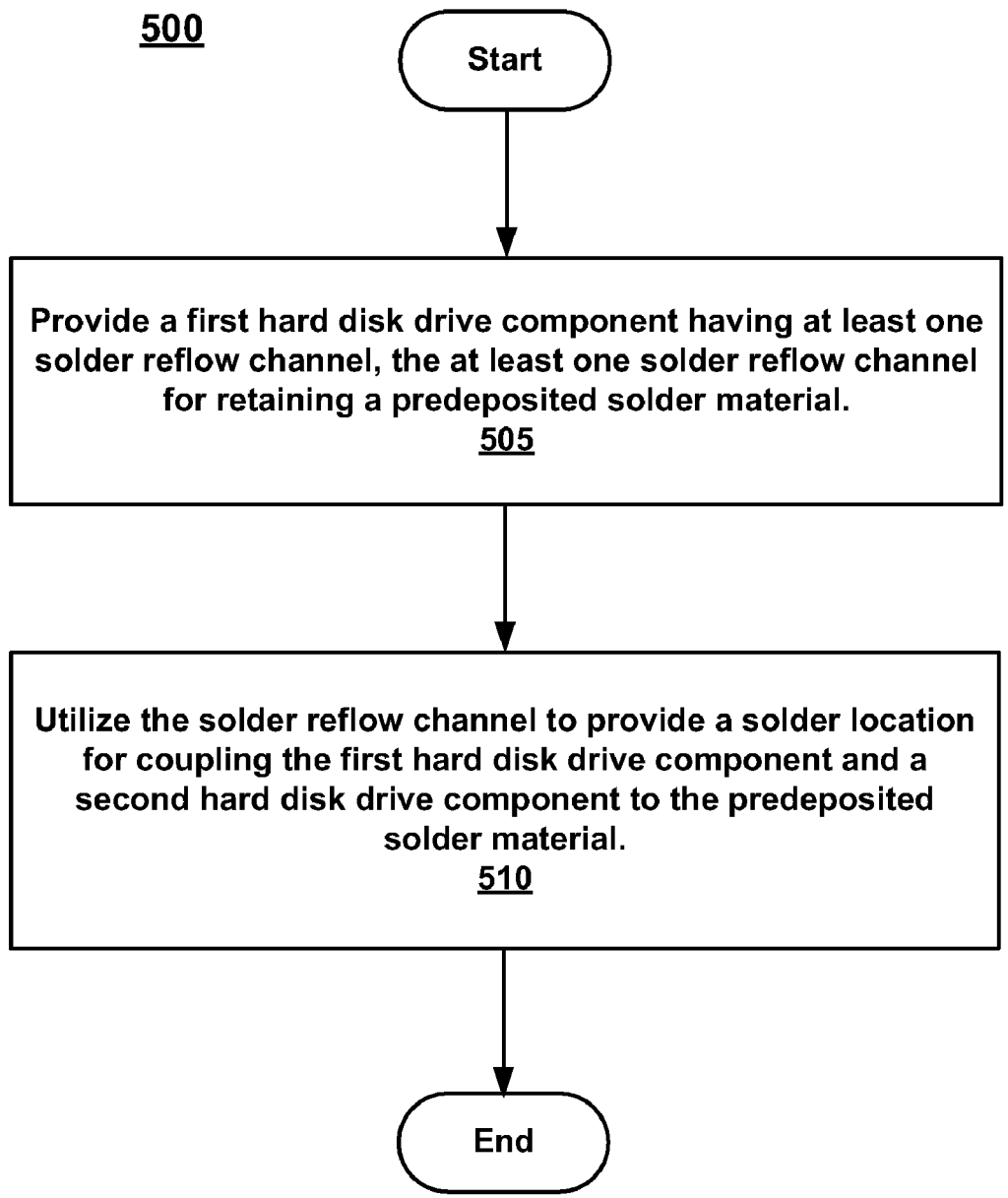
FIG. 5 is a flowchart of a method of utilizing a solder reflow channel in the formation of a hard disk drive, in accordance with one embodiment of the present invention.

Referring now to 505 of FIG. 5 and as described herein, a first hard disk drive component having at least one solder reflow channel 405A is provided in accordance with one embodiment. The at least one solder reflow channel 405A is for retaining predeposited solder material 410.

Referring to 510 of FIG. 5 and as described herein, solder reflow channel 405A provides solder location 415 for coupling the first hard disk drive component and a second hard disk drive component with predeposited solder material 410.

In one embodiment and as described herein, at least one reservoir 420A is provided before predeposited solder material 410 is heated and flows into the at least one solder reflow channel 405A. The at least one reservoir 420A is coupled with the at least one solder reflow channel 405A and the first hard disk drive component.

In one embodiment, a retaining mechanism is utilized to hold the first hard disk drive component (such as an HGA mount plate) and the second hard disk drive component (such as a carriage arm) together before providing heat sources 425A and 425B. It should be noted that embodiments of the present technology are well suited to use without requiring a retaining mechanism.

In another embodiment, the first component of the hard disk drive that is soldered with the second component of the hard disk drive is disengaged by heating predeposited solder material 410 with heating sources 425A and 425B.

As described herein, in one embodiment the weld is a laser weld. In one embodiment, the components that are formed from the interlocking dissimilar metal components can include a mount plate portion of a head gimbal assembly, an arm portion of a head gimbal assembly, a load beam portion of the head gimbal assembly, or an entire ELS. Additionally, the dissimilar metal component could be used to form a cover portion for the hard disk drive.

Thus, embodiments of the present invention provide a method and system for utilizing a solder reflow channel in the formation of a hard disk drive. In one embodiment, a predeposited lead based material in a solder reservoir coupled with a mount plate of an HGA is heated with a laser. The lead based material heats up and consequently flows into a solder reflow channel also coupled with the mount plate. While the mount plate is in contact with a first surface of the lead based material retained in the solder reflow channel, an actuator arm is in contact with a second surface of the lead based material. Once the lead based material is permitted to cool, the mount plate and the actuator arm are caused to be soldered together. Thus, two components of a hard disk drive may be coupled without the disturbances caused by the mechanical swaging process.

Furthermore, the mount plate and the actuator arm may be disengaged by heating the predeposited material again, and thus enabling the disconnection of the two hard disk drive components. In this manner, two soldered components of a hard disk drive may be easily disassembled.

While the method of the embodiment illustrated in flowchart 500 shows specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention are thus described. While the present invention has been described in particular embodiments, it should be appreciated that the present invention should not be construed as limited by such embodiments, but rather construed according to the below claims.

What is claimed is:

1. A method of utilizing a solder reflow channel in the formation of a hard disk drive comprising:
   providing a first hard disk drive component having at least one solder reflow channel, said at least one solder reflow channel for receiving a predeposited solder material that is heated and retaining said predeposited solder material;
   utilizing said solder reflow channel to provide a solder location for coupling said first hard disk drive component and a second hard disk drive component to said predeposited solder material; and
   providing at least one reservoir to hold said predeposited solder material before said predeposited solder material is heated and flows into said at least one solder reflow channel from said at least one reservoir, said at least one reservoir coupled with said at least one solder reflow channel and said first hard disk drive component, and wherein said at least one reservoir does not include said solder location.

2. The method of claim 1, further comprising:
   receiving heat from a heating source to solder said first hard disk drive component with said second hard disk drive component, wherein said heating source heats said predeposited solder material.

3. The method of claim 2, further comprising:
   receiving said heat from a laser.

4. The method of claim 2, further comprising:
   utilizing a retaining mechanism to hold said first hard disk drive component and said second hard disk drive component together before said receiving said heat from said heating source.

5. The method of claim 1, comprising:
   utilizing a head stack assembly as said first hard disk drive component.

6. The method of claim 1, comprising:
   utilizing a head gimbal assembly as said first hard disk drive component.

7. The method of claim 1, comprising:
   receiving a lead based material as said predeposited solder material.

8. The method of claim 1, wherein said method is suitable for use without requiring a swaging process.

9. The method of claim 1, further comprising:
   receiving heat from said heating source to enable disengaging of said first component of a hard disk drive soldered with said second component of a hard disk drive, wherein said heating source heats said predeposited solder material.

10. A hard disk drive comprising:
    a housing;
    at least one disk mounted to the housing;
    an actuator mounted to the housing and being movable relative to the at least one disk, the actuator having a suspension for reaching over the disk, the suspension having a head gimbal assembly thereon, said hard disk drive providing a method of utilizing a solder reflow channel in the formation of said hard disk drive comprising:

provihing a first hard disk drive component having at least one solder reflow channel, said at least one solder reflow channel for receiving a predeposited solder material that is heated and holding said predeposited solder material;

utilizing said solder reflow channel to provide a solder location for coupling said first hard disk drive component and a second hard disk drive component to said predeposited solder material; and providing at least one reservoir to hold said predeposited solder material before said predeposited solder material is heated and flows into said at least one solder reflow channel from said at least one reservoir, said at least one reservoir coupled with said at least one solder reflow channel and said first hard disk drive component, and wherein said at least one reservoir does not include said solder location.

11. The hard disk drive of claim 10, further comprising:
receiving heat from a heating source to solder the said first hard disk drive component with said second hard disk drive component, wherein said heating source heats said predeposited solder material.

12. The hard disk drive of claim 10, further comprising:
receiving said heat from a laser.

13. The hard disk drive of claim 10, further comprising:
utilizing a carriage arm of a head stack assemble as said first hard disk drive component.

14. The hard disk drive of claim 10, further comprising:
utilizing a head gimbal assembly as said first hard disk drive component.

15. A solder reflow channel reservoir system comprising:

at least one solder reflow channel on a surface of a first hard disk drive component configured for receiving a predeposited solder material that is heated and for retaining said predeposited solder material;

at least one solder reservoir to hold said predeposited solder material before said predeposited solder material is heated and flows into said at least one solder reflow channel from said at least one solder reservoir, said at least one solder reservoir coupled with said solder reflow channel at said first hard disk drive component; and a solder location at which to couple said first hard disk drive component with a second hard disk drive component by heating said predeposited solder material with a heating source, wherein said at least one solder reservoir does not include said solder location.

16. The solder reflow channel reservoir system of claim 15, wherein said first hard disk drive component is a head stack assembly.

17. The solder reflow channel reservoir system of claim 15, wherein said first hard disk drive component is a head gimbal assembly.

18. The solder reflow channel reservoir system of claim 15, wherein said predeposited solder material is lead based.

* * * * *